United States Patent

[11] 3,599,606

| [72] | Inventor | David W. Hayward<br>6379 Budlong Lake Ave., San Diego, Calif. 92119 |
|---|---|---|
| [21] | Appl. No. | 851,676 |
| [22] | Filed | Aug. 20, 1969 |
| [45] | Patented | Aug. 17, 1971 |

[54] ANIMAL-SCRATCHING DEVICE
9 Claims, 4 Drawing Figs.

[52] U.S. Cl. ................................................ 119/1, 119/29
[51] Int. Cl. .......................................... A01k 13/00, A01k 29/00
[50] Field of Search .......................... 119/1, 29, 50, 55, 75, 76, 159, 91; 15/171, 21

[56] References Cited
UNITED STATES PATENTS

| 2,721,538 | 10/1955 | Latham | 119/91 |
| 3,175,537 | 3/1965 | Paul | 119/157 |
| 3,425,427 | 2/1969 | Anderson | 15/21 |

*Primary Examiner*—Aldrich F. Medbery
*Attorney*—Carl R. Brown

ABSTRACT: An animal-scratching device in which an animal steps on a platform energizing a power source that moves a scratching device positioned adjacent to the platform to scratch the animal, which power source is only energized while the animal is standing or pressing down on the platform.

PATENTED AUG 17 1971 3,599,606
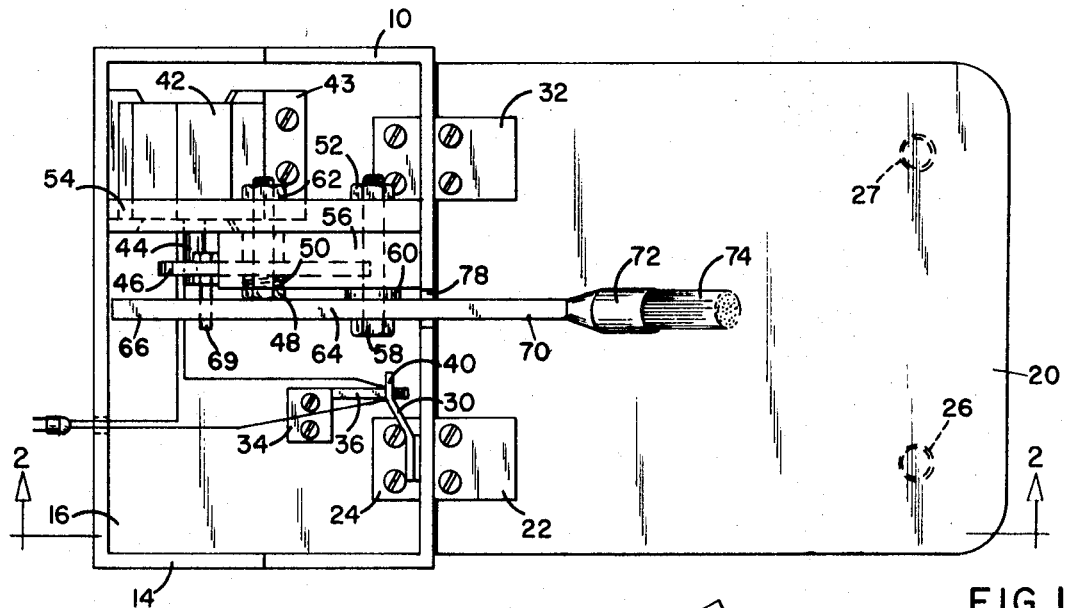
FIG.1
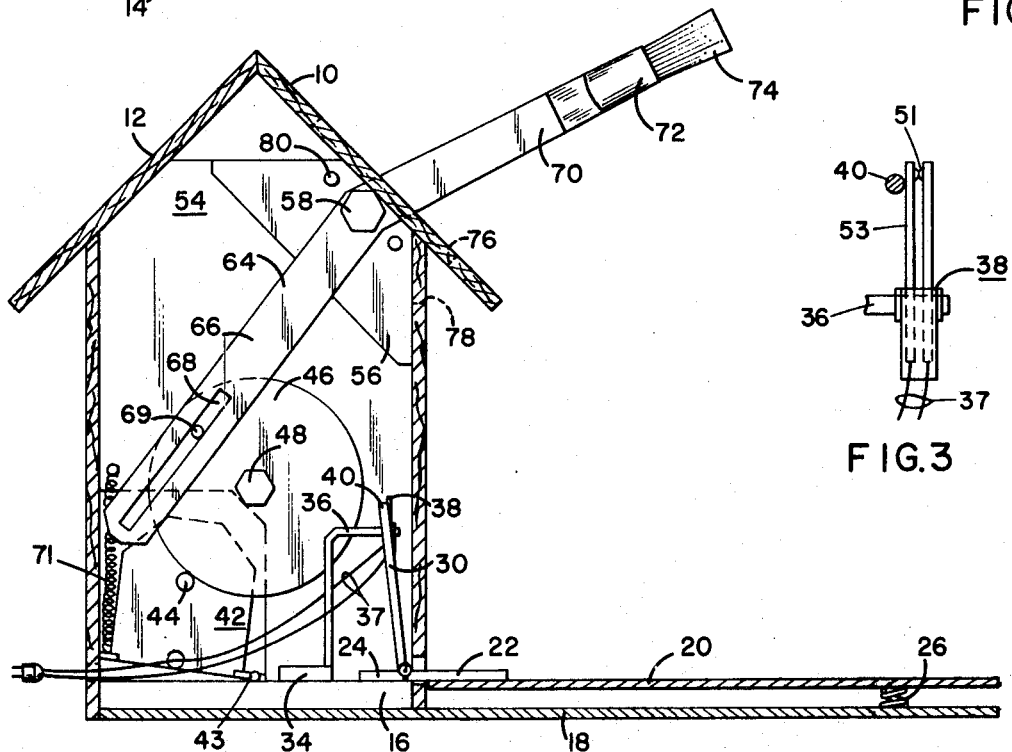
FIG.2
FIG.3
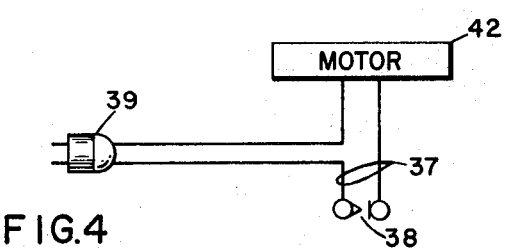
FIG.4
*INVENTOR.*
DAVID W. HAYWARD
BY Carl A. Brown
ATTORNEY

ANIMAL-SCRATCHING DEVICE

BACKGROUND OF THE INVENTION

There are existing animal-scratching devices. However these animal-scratching devices are normally large structures that are secured to posts driven into the ground and that employ brushes that are spring mounted to position the device for self-scratching of large animals, such as cows, pigs, and the like. These devices do not lend themselves to pet-type animal-scratching devices and further do not have power means for operating a unit that scratches the animal without corresponding joint movement of the animal. Rather the prior art devices are similar to scratching posts and do not employ separate means for moving the scratching element.

Thus it is advantageous to have a relatively simple to operate and compact scratching device that may, upon slight education of the animal, be operated by the animal to selectively scratch himself in an easy, simple, and yet safe manner and which device is deenergized upon the animal leaving the scratching device.

SUMMARY OF THE INVENTION

In an embodiment of this invention, a movable scratching member having a brush or like scratching end tip, is positioned to contact an animal such as a pet. The movable scratching member is supported on a structure that houses a motor drive unit that through a crank arrangement, moves the tip portion of the scratching member. Positioned immediately adjacent or under the scratching tip portion is a platform that when depressed by the animal, energizes the motor to move the scratching member and the tip portion thereof to scratch the animal.

Thus the animal by stepping on the platform mechanism and positioning himself in contact with the movable member and the tip portion, both switches on the motor that drives the scratching member and positions himself to be contacted by the tip portion of the scratching member. Accordingly, the animal with slight education gained from experience in using the device, will learn to push the platform down and scratch himself in a safe manner.

It is therefore an object of this invention to provide a new and improved animal-scratching device.

It is another object of this invention to provide a new and improved animal-scratching device that is capable of being operated by the animal when the animal positions himself in a location to be contacted by the movable scratching member.

It is another object of this invention to provide a new and improved animal-scratching device that is simple in operation, may be safely energized and deenergized by the animal, and that operates when the animal is in a position to be scratched by the movable scratching member.

Other objects and many advantages of this invention will become more apparent upon a reading of the following detailed description and an examination of the drawings, wherein like reference numerals designate like parts throughout and in which:

FIG. 1 is a top plan view with the roof removed from the housing unit of an embodiment of the invention.

FIG. 2 is a side elevation in secton taken along lines 2-2 of FIG. 1.

FIG. 3 is an enlarged view of the switching device employed in the invention.

FIG. 4 is a schematic diagram of a motor control circuit.

Referring now to FIGS. 1 and 2, a housing 10 has a boxlike wall structure 14 with a roof 12. A base member 18 forms a base for the housing 10 and extends beyond one side of the housing 10 forming a platform. A member 16 fits on platform 18 forming a floor for the housing 10. A second platform 20 is supported by hinges 22 and 32 for pivotal movement relative to the housing 10 with the outer end portion being resiliently supported by springs 26 at a spaced distance above the platform 18. A central vertical wall 54 is positioned in the housing 10 and forms an additional support for the walls 14 and the roof 12. A plate 56 is secured to the side of the wall member 54 by a bolt 58 and a nut 52. A movable scratching member 64 having integral angled arms 66 and 70 is mounted on bolt 58 between the head portion and washer 60 on the plate 56 and wall 54. The adjacent sides of the washer 60 and the bolthead provide bearing surfaces for pivotal movement of the scratching member 64. An opening 76 in the roof 12 and an opening 78 in the wall 14 provides slots for vertical movement of the arm 70.

Arm 66 has a slot 68 in which is positioned a crank member 69 that is secured to the circular drive wheel 46. Drive wheel 46 is supported by bolt member 48 and spring member 50 and is secured in position by nut 62. Thus the wheel 46 is driven in a rotational movement by a friction drive shaft 44 of the electric motor 42. The electric motor 42 is pivotally secured in position at one end by hinge 43, with the other end being biased vertically upward in the opening in wall 54 by spring 71 to hold the friction drive shaft 44 into frictional contact with the wheel 46.

A plate 34 is secured to the base member 16 and has a vertical angled bar member 36 that supports a leaf switch unit 38. The leaf switch 38 is connected by electrical contact members 37 to close the electrical circuit from the electrical plug 39 to the motor 42 (see FIG. 4). An upright member 30 is connected to the hinge member 22 and has an end bar 40 that moves in a substantially horizontal direction with vertical movement of the hinge member 22. Thus movement of platform 20 causes movement of the hinge member 22 moving arm 30 and end member 40 to close the contacts 51 of switch 38. This closes the circuit to the motor 42 energizing the motor. The leaf springs of the switch 38 have insulated sides 53 to prevent electrical contact to the bar member 40.

A tip ferrule 72 on the end of the arm 70 supports a scratching brush 74. The height of the tip 72 above the platform 20 is such that the brush 74 contacts the side of the animal that depresses the platform 20. Holes 80 allow the bolt 58 to be selectively moved, thereby adjusting the height of the brush 74.

In operation, an animal such as a dog, cat, or the like, moves onto platform 20 with its body in position to contact the scratching brush 74. The movement of the animal onto the platform 20 moves the hinge portion 22 in a clockwise direction along with the bar end 40 closing switch 38. Through electrical conductors 37, the motor 42 is energized, rotating wheel 46 that, in movement of drive pin 69 in slot 68, pivots the arms 66 and 70 in pivotal movement on the bolt 58. This pivotal movement causes vertical and slightly horizontal movement of the brush 74 in a reversible path to scratch the animal.

Having described my invention, I now claim:

1. An animal-scratching device comprising,
    a movable scratching member having an end portion positioned to contact an animal,
    first means for moving said scratching member, in a reversible path
    and second means separate from said scratching member for being actuated by the animal and energizing said first means to move said scratching member and scratch the animal.

2. An animal-scratching device as claimed in claim 1 in which,
    said first means moves said scratching member in a pivotal oscillatory manner.

3. An animal-scratching device as claimed in claim 1 including,
    third means responsive to movement of said platform for energizing said first means,
    a housing for enclosing said first and third means,
    said platform is pivotally secured to said housing,
    and said movable scratching member comprises an arm, pivotally connected to said housing, with a scratching end tip positioned above said movable platform.

4. An animal-scratching device as claimed in claim 3 in which,
said first means includes a motor positioned in said housing, drive means responsive to operation of said motor for pivotally moving said scratching member,
and said third means comprises a switch that is actuated by movement of said movable platform from a first position to a second position for energizing said motor.

5. An animal-scratching device as claimed in claim 4 including,
resilient means for normally biasing said movable platform to said first position.

6. An animal-scratching device as claimed in claim 5 including,
a fixed platform positioned under said movable platform,
and said resilient means comprises at least one spring member positioned between said movable and said fixed platforms.

7. An animal-scratching device as claimed in claim 1 in which,
said movable scratching member comprises a pivotally mounted first arm portion and a second arm integral with said first arm,
said pivotal mounting is substantially at the connection of first and second arms,
said motor when energized drives a wheel with an offset drive pin,
and said second arm has a longitudinal slot for receiving said drive pin.

8. An animal-scratching device as claimed in claim 7 in which,
said movable platform is pivotally connected by hinge members to said housing,
a bar is connected to one of said hinge members and is moved by movement of said movable platform,
and movement of said bar closes said switch.

9. An animal-scratching device as claimed in claim 1 in which,
said first means includes frictional drive means for permitting overriding of the movement of said scratching member.